United States Patent [19]
Kim

[11] Patent Number: 5,866,962
[45] Date of Patent: Feb. 2, 1999

[54] ROTOR POSITION DETECTING APPARATUS IN SWITCHED RELUCTANCE MOTOR

[75] Inventor: Ki-Bong Kim, Suwon, Rep. of Korea

[73] Assignee: Samsung Electronics Co., Ltd., Suwon, Rep. of Korea

[21] Appl. No.: 946,362

[22] Filed: Oct. 7, 1997

[30] Foreign Application Priority Data

Nov. 30, 1996 [KR] Rep. of Korea ................. 1996-60321

[51] Int. Cl.⁶ ............ H02K 11/00; H02K 1/22; H02K 33/10; H02K 35/00

[52] U.S. Cl. .................. 310/68 B; 310/39; 310/166; 310/168; 310/171; 318/287; 318/295

[58] Field of Search ................. 310/39, 68 B, 310/91, 166, 168, 171; 318/287, 295

[56] References Cited

U.S. PATENT DOCUMENTS

| | | | |
|---|---|---|---|
| 5,239,218 | 8/1993 | Hashimotor et al. | 310/68 B |
| 5,325,006 | 6/1994 | Uno et al. | 310/90 |
| 5,342,180 | 8/1994 | Daoud | 417/412 |
| 5,369,322 | 11/1994 | Maruyama et al. | 310/39 |

*Primary Examiner*—Thomas M. Dougherty
*Assistant Examiner*—Tran N Nguyen
*Attorney, Agent, or Firm*—Burns, Doane, Swecker & Mathis, L.L.P.

[57] ABSTRACT

A switched reluctance motor is provided with a rotor position detecting apparatus for detecting a rotor position wherein the apparatus comprises a rotor position-sensing mechanism removably mounted in a ventilator hole formed in a side wall of a motor housing for enabling an easy replacement of printed circuit boards and photo-interrupters when they need to be repaired and maintained. The sensing mechanism includes a fixing member having spaced slots for receiving respective circuit boards.

1 Claim, 6 Drawing Sheets

ROTOR POSITION DETECTING APPARATUS IN SWITCHED RELUCTANCE MOTOR

BACKGROUND OF THE INVENTION

1. Field of the Invention

The present invention relates to a rotor position detecting apparatus in a switched reluctance motor (SRM), and more particularly to a rotor position detecting apparatus in SRM for enabling an easy replacement of a printed circuit board (PCB) and photo-interrupters when they are repaired and maintained.

2. Description of the Prior Art

There is a mutual input signal between SRM and PCB in a conventional mode. When power is supplied, the motor starts operation with an input of an angle between a stator pole and a rotor pole in PCB wherein the angle indicates a rotor position.

Even though there have been a few rotor position detecting sensors, such as hall sensor, encoder and photo-interrupter, only photo-interrupter will be specifically described hereinafter. As shown in FIGS. 1 and 2, the conventional SRM comprises a housing screwed at a circular supporting board (10) and a circulating shaft (30) being connected to the circular supporting board (10) by bearings (40) for simultaneous rotation. At a predetermined distance from the inner wall of stators (50) attached into a housing (20) is a rotor (60) which is designed to drive simultaneously along with the circulating shaft (30).

On the other hand, a rotor position detecting apparatus (70) is installed at an inner wall of the housing (20) and at an outer wall of the circulating shaft (30) to detect the position of the rotor (60). The position detecting apparatus (70) includes a PCB (71) that is closely placed at a side wall of the housing (20) coaxially with the circulating shaft (30), and photo-interrupters (72) with a U-shaped sensing part (72a) at an angle within a certain radius from the center of PCB (71).

In addition, there are a fixing member (73) screwed to drive simultaneously with the circulating shaft (30) and a sensor disc (74) screwed at a side wall of the fixing member (73) with a folded part (74a) perpendicularly disposed at a predetermined angular interval. Position of the folded part (74a) of the sensor disc (74) is detected by the sensing part (72a) of the photo-interrupters (72) Reference numeral 21 designates a ventilator (i.e., a hole) placed at a predetermined angle toward a periphery of the housing (20).

When power is supplied to the PCB (71), as described above, the conventional SRM serves to detect the position of the rotor (60) with the photo-interrupter (72) by way of the circulating shaft (30), the fixing member (73) and the sensor disc (74), and then to notify the detected position of the rotor to PCB (71) to drive the circulating shaft (30) along with the driving rotor (60).

Thus, the position of the rotor (60) is recognized when the folded part (74a) of the sensor disc is located in the sensing parts (72a) of a plurality of photo-interrupters (72). When PCB or photo-interrupters are repaired and maintained, the supporting board (10) needs to be disconnected from the housing (20), the PCB (71) needs to be unscrewed out of the side wall of the housing (20), and the circulating shaft (30) needs to be disassembled from the housing (20). Accordingly the PCB with photo-interrupters is also disassembled and reassembled with the circulating shaft in the conventional SRM when PCB or photo-interrupters are repaired and maintained. These processes are inconvenient and time-consuming when PCB or photo-interrupters are repaired and maintained. In addition the folded part of the PCB can be bent due to the centrifugal force when a motor of a cleaner, for instance, is spinning fast at its high speed.

SUMMARY OF THE INVENTION

It is an object of this invention to provide a rotor position detecting apparatus in SRM for enabling an easy replacement of a printed circuit board (PCB) and photo-interrupters when they are repaired and maintained. In the present invention the rotor position is detected by the photo-interrupters installed by way of the PCB fixing member and PCB on the ventilator which is on the cylinder of the housing.

The SRM of the present invention comprises the sensing method inserted in the ventilator attached at a predetermined angle toward a periphery of the housing with a stator. The sensing method is made up of PCB fixing member inserted into the ventilator at a periphery of the housing, a PCB securely attached onto the PCB fixing member, the electrically linked photo-interrupters with light emitting and receiving elements which faced each other, a fixing member screwed onto the circulating shaft for simultaneous rotation, and a sensor disc on the circulating shaft and on the side wall of the fixing member including protruded parts which rotate through the sensing part of the photo-interrupters.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
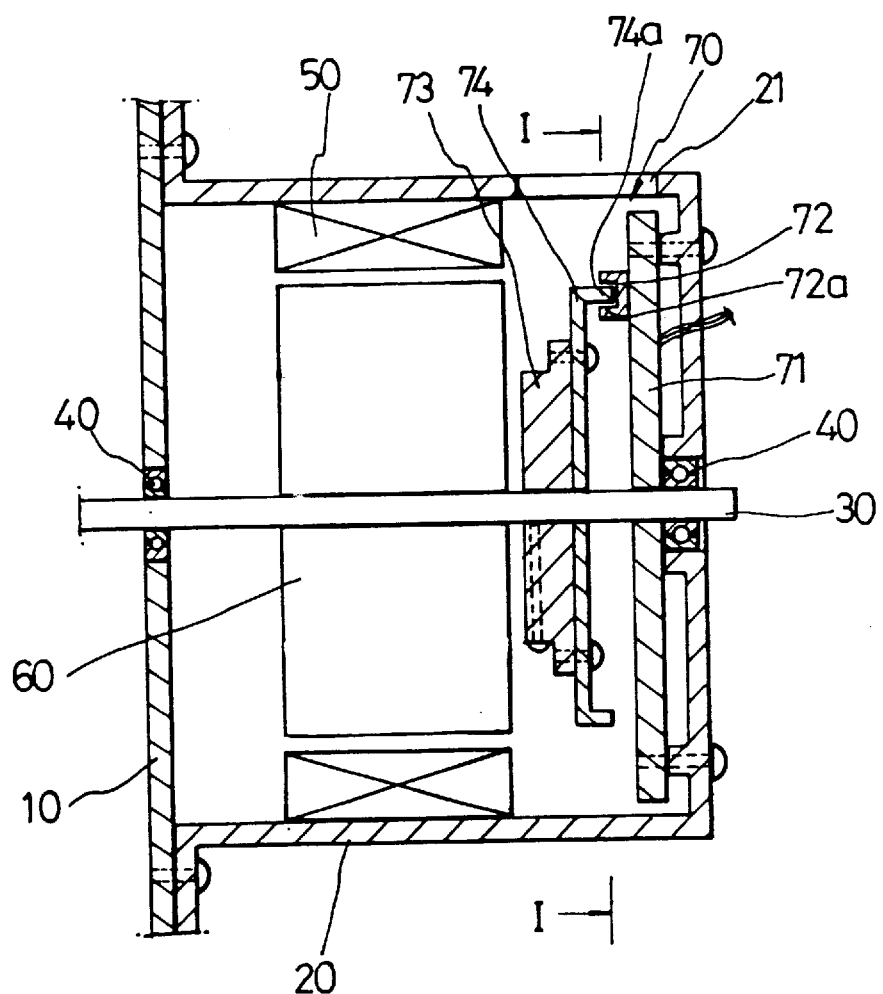
FIG. 1 is a brief vertical sectional view of the conventional SRM.
Figure 2:
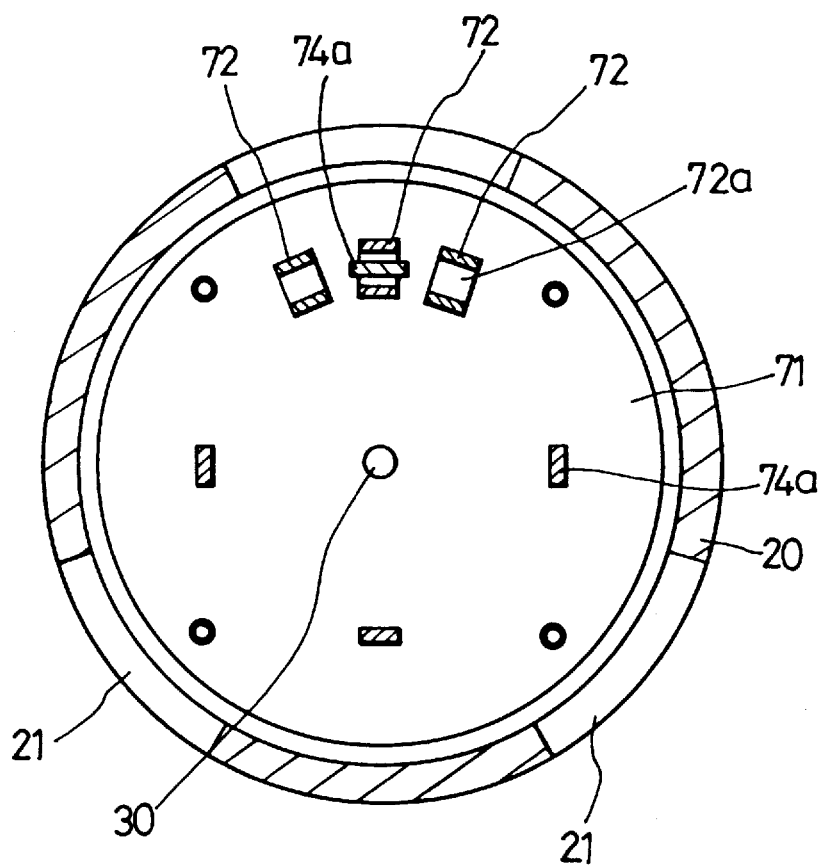
FIG. 2 is a sectional view taken along line I—I in FIG. 1.
Figure 3:
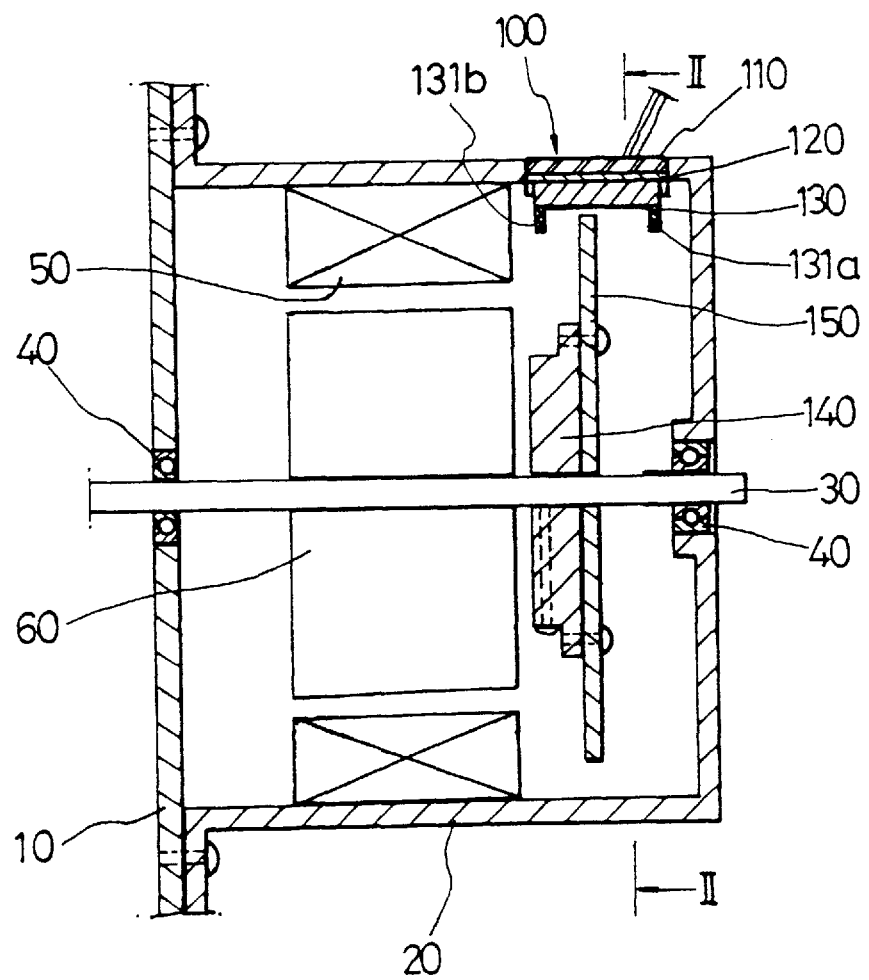
FIG. 3 is a brief vertical sectional view of SRM in accordance with the present invention.
Figure 4:
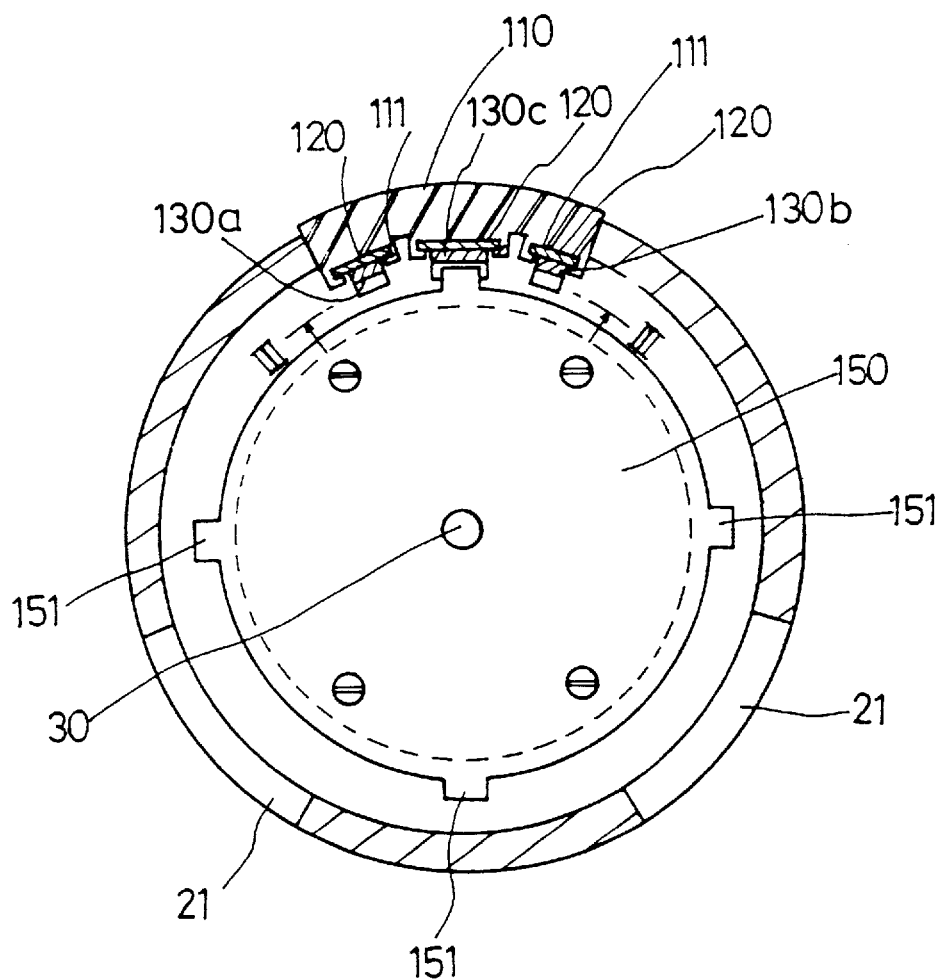
FIG. 4 is a sectional view taken along line II—II in FIG. 3.
Figure 5:
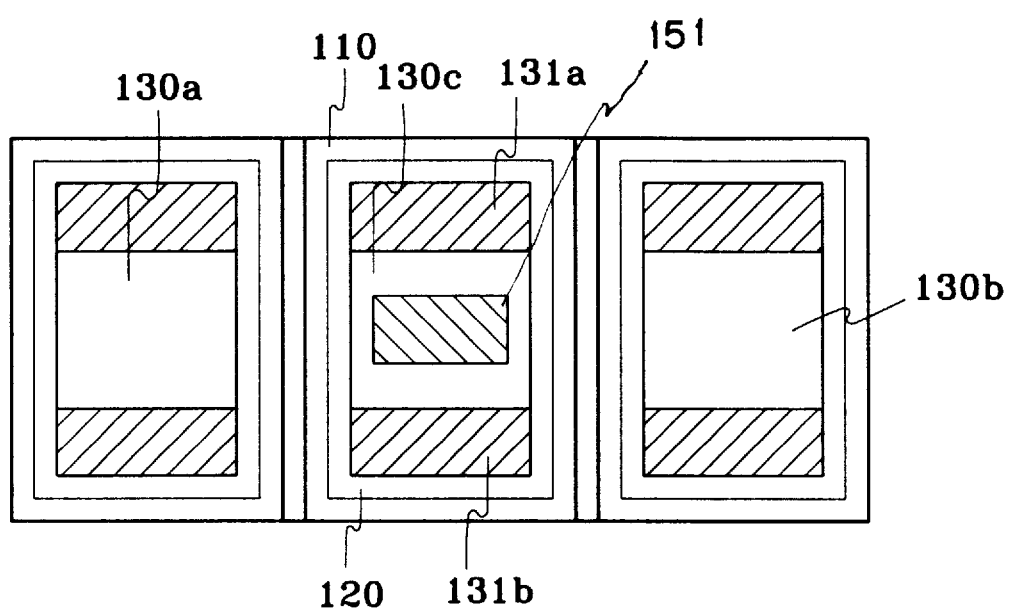
FIG. 5 is a sectional view taken along line III—III in FIG. 4.

In the present invention a rotor position detecting apparatus in SRM is described in detail with reference to the drawings. FIG. 3 is a brief vertical sectional view of SRM in accordance with the present invention. FIG. 4 is a sectional view taken along line II—II. FIG. 5 is a sectional view taken along line III—III, wherein parts of the present invention are identically labeled as those of the conventional method without providing the detailed description.

The rotor position detecting apparatus of the present invention comprises a housing (20) screwed to a circular supporting board (10) and a circulating shaft (30) attached on the supporting board (10) and an end wall of the housing (20) by bearings (40) for rotation. The rotor (60) is installed to rotate along with the circulating shaft (30) at the inner wall of the stator (50) fixed to a side wall of the housing (20). A sensing mechanism (100) is fixedly inserted into the ventilator (21) at a periphery of the housing (20) at a predetermined angle.

Here, the sensing (100) comprises a PCB fixing member (110) inserted in the ventilator, three PCB (120) attached into the PCB fixing member (110), photo-interrupters (130) soldered in each PCB including light emitting (131a) and receiving (131b) elements which face each other, a fixing member (140) connected to the circulating shaft (30) for simultaneous rotation and a sensor disc (150) which is screwed on the side wall of the fixing member (140) and inserted into the circulating shaft, including a number of radially outwardly protruded parts (151) spaced apart by a predetermined angle to circulate through sensing parts of the photo-interrupters (130) The PCB fixing member (110) comprises a plurality of slots arranged at a predetermined angular interval to insert respective ones of the PCB, while the photo-interrupters are made up of phase position sensors for A (130a), B (130b) and C (130c) phases.

Figure 6:
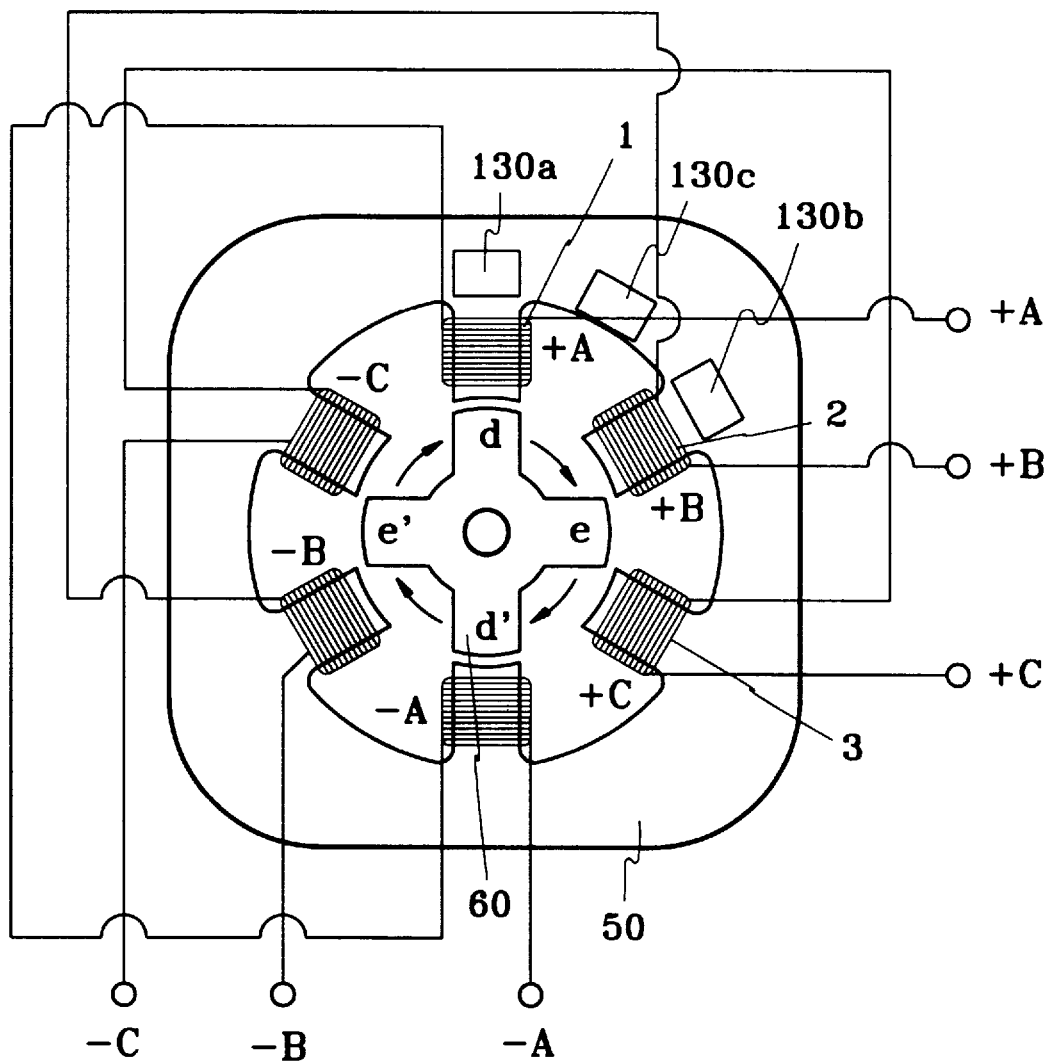
FIG. 6 illustrates an operational process of SRM in accordance with the present invention.

Hereinafter, operation and effect of a rotor position detecting apparatus in the present invention are described in detail with reference to FIG. 6. It illustrates SRM with a stator (50) and a rotor (60), the former with 3 pairs of poles (+A, −A, +B, −B, +C, −C ) and the latter (60) with 2 pairs of poles (d, d', e, e') of permanent magnet. The stator includes +A and −A poles, +B and −B poles, and +C and −C poles, wherein each pair of poles are wound with A, B and C plane coils in the respective order. Each phase position sensor (130a, 130b, 130c) is placed at the +A, +B and between +A and +B phase poles of the stator (50).

In the SRM as described above, wherein the rotor poles (d d' e e') are placed on the B phase position sensor (130b) from which sends a rotor detecting signal to PCB (120) to transmits direct current (DC) voltage to A phase coil (1). When the A phase poles wound with A phase coil (1) are magnetized, which generates a force to pull closely placed rotor poles and to rotate the rotor (60).

Accordingly the rotor poles (d d' e e') are placed onto the A phase position sensor (130a) from which a rotor detecting signal is sent to PCB (120) to transmit DC voltage to C phase coil (3). Thus, the C phase poles wound with C phase coil (3) are magnetized, which generates a force to pull closely placed rotor poles and to rotates the rotor (60).

Finally the rotor poles (d d' e e') are placed onto the C phase position sensor (130c) from which the rotor detecting signal is sent to PCB (120) to transmit DC voltage to B phase coil (2). Thus, the B phase pole wound with B phase coil (2) are magnetized, which generates a force to pull closely placed rotor the poles and rotates the rotor (60).

As described above, the sequential transmission of DC voltage into A (1), C (3) and B (2) plane coils continuously keeps the rotating force of the rotor (60) constant. In order to rotate the rotor continuously it is necessary to detect the position of the rotor (60) correctly and to magnetize each of the stator poles (+A, −A, +B, −B, +C, −C) with proper transmission of DC voltage into their respective coils (1,2, 3). Therefore, it is indispensable that a rotor position detection sensor for detecting position of the rotor should be installed in SRM.

At this time the photo-interrupters (130) are made up of the A (130a), B (130b), and C (130c) phase position sensors, and the protruded parts (151) formed in the sensor disc (150) rotating along with the circulating shaft (30) of the rotor (60) is placed into the corresponded rotor poles.

Therefore, the photo-interrupters can detect the position of the rotor poles by detecting the position of the protruded parts (151) of the sensor disc (150), which is immediately notified to the PCB (120).

While the protruded part (151) of the sensor disc (150) is placed between light emitting (131a) and receiving (131b) elements of the A phase position sensor (130a), A position sensor (130a) sends a "high" labeled signal to the PCB (120). The identical operations repeat with the B phase position sensor (130b) and with the C plane position sensor (130c) in sequence. When the PCB (120) takes a rotor position signal from the photo-interrupters (130), the rotor (60) is rotated by conduction of DC voltage to respective phase coils (1,2,3) and magnetization of respective stator poles (+A, −A, +B, −B, +C, −C) according to subsequent position signals.

The protruded part (151) of the sensor disc (150) is located correspondingly to rotor poles (d, d', e, e'), which means that a position of the protruded part indicates directly a position of the rotor poles (d, d', e, e'). Thus, the protruded part (151) of the sensor disc (150) is located on light emitting and receiving elements (131a, 131b) of the photo-interrupters (130), indicating a detected position of the rotor (60).

The photo-interrupters (130) are composed of a pair of detection elements of light emitting and receiving elements (131a, 131b). A pulse signal of "high" or "low" is sent to PCB depending on whether light is received or not. When there are some problems with PCB (120) or photo-interrupters (130) in SRM comprising the rotor position detecting apparatus of the present invention, they can be conveniently checked and changed by getting the PCB fixing member (110) taken out of the ventilator (21) of the housing (20).

According to the present invention described above, the protruded part (151) of the sensor disc (150) installed by the fixing member (140) on the circulating shaft (30) indicates the position of the rotor (60) with the photo-interrupters (130) arranged in the ventilator (21) formed in the cylinder of the housing (20) by means of PCB fixing member (110) and PCB (120), so that the PCB (120) and the photo-interrupters (130) can be conveniently repaired and maintained.

The embodiments of the present invention described above are mere examples of SRM including 3 phase position sensors with 6/4 poles. The actual scope of the present invention is not limited in the presented embodiments. It is believed evident that many variations be made by those skilled in the art without departing from the spirit and scope of this invention.

What is claimed is:

1. A switched resistance motor comprising:
   a housing including a longitudinally extending side wall forming an internal space and defining a longitudinal axis, the space being closed at longitudinal ends thereof;
   a stator disposed in the space and fixed to the side wall;
   a rotor mounted in the space adjacent the stator for rotation about the longitudinal axis; and
   a sensing mechanism for detecting an angular position of the rotor, including:
      a fixing member mounted in a hole formed in the side wall, the fixing member including a plurality of slots disposed in the space and spaced apart at a predetermined angular interval in a direction of rotation of the sensor disc,
      printed circuit boards mounted in respective ones of the slots, photo-interrupters mounted on respective ones of the printed circuit boards, each photo-interrupter including a light emitting element and a light receiving element that face each other,
      a sensor disc mounted for simultaneous rotation with the rotor about the axis, the sensor disc including circumferentially spaced, radially outwardly protruding parts arranged to pass between the light emitting element and the light-receiving element of each of the photo-interrupters during rotation of the rotor.

* * * * *